United States Patent
Feineis et al.

(10) Patent No.: US 12,214,734 B2
(45) Date of Patent: Feb. 4, 2025

(54) FUNCTIONAL INTERIOR FITTING PART FOR A MOTOR VEHICLE, AND METHOD FOR PRODUCING SUCH A FUNCTIONAL INTERIOR FITTING PART

(71) Applicant: LISA DRÄXLMAIER GMBH, Vilsbiburg (DE)

(72) Inventors: Martin Feineis, Landshut (DE); Andreas Herb, Gauting (DE)

(73) Assignee: LISA DRAXLMAIER GMBH, Vilsbiburg (DE)

( * ) Notice: Subject to any disclaimer, the term of this patent is extended or adjusted under 35 U.S.C. 154(b) by 359 days.

(21) Appl. No.: 17/778,874

(22) PCT Filed: Nov. 18, 2020

(86) PCT No.: PCT/EP2020/082526
§ 371 (c)(1),
(2) Date: May 23, 2022

(87) PCT Pub. No.: WO2021/104963
PCT Pub. Date: Jun. 3, 2021

(65) Prior Publication Data
US 2022/0410818 A1    Dec. 29, 2022

(30) Foreign Application Priority Data
Nov. 25, 2019  (DE) ................ 10 2019 131 783.5

(51) Int. Cl.
*B60R 13/02*    (2006.01)
*B32B 3/26*    (2006.01)
(Continued)

(52) U.S. Cl.
CPC .............. *B60R 13/02* (2013.01); *B32B 3/266* (2013.01); *B32B 5/02* (2013.01); *B32B 7/12* (2013.01);
(Continued)

(58) Field of Classification Search
CPC . B60R 13/02; B60R 2013/0287; B32B 3/266; B32B 7/12; B32B 27/12;
(Continued)

(56) References Cited

U.S. PATENT DOCUMENTS 9,448,631 B2 * 9/2016 Winter ................ G06F 3/03547
9,875,866 B2 * 1/2018 Liao ........................ H01H 13/85
(Continued)

FOREIGN PATENT DOCUMENTS

DE  102015015417 A1  1/2017
EP  3184348 A2  6/2017

OTHER PUBLICATIONS

DE102015015417A1 machine language English translation of the Abstract.
International Search report for PCT/EP2020/082526.

*Primary Examiner* — Joseph D. Pape
(74) *Attorney, Agent, or Firm* — BelayIP

(57) ABSTRACT

A functional interior trim part for a vehicle is disclosed. The trim part includes a layered structure having at least a base support, a functional layer and a haptic layer. The functional interior trim part includes an electrical shielding layer. The electrical shielding layer leads to a selective sensor field expression in the direction of an operating half-space. The electrical shielding layer is arranged on a side of the functional layer facing away from the haptic layer. A method for manufacturing the interior trim part is also disclosed.

10 Claims, 1 Drawing Sheet

(51) Int. Cl.
*B32B 5/02* (2006.01)
*B32B 7/12* (2006.01)
*B32B 27/12* (2006.01)
*B32B 27/36* (2006.01)
*B60Q 9/00* (2006.01)
*B32B 37/15* (2006.01)

(52) U.S. Cl.
CPC ............ *B32B 27/12* (2013.01); *B32B 27/365* (2013.01); *B60Q 9/00* (2013.01); *B32B 37/15* (2013.01); *B32B 2307/202* (2013.01); *B32B 2307/412* (2013.01); *B32B 2307/414* (2013.01); *B32B 2451/00* (2013.01); *B32B 2605/003* (2013.01); *B60R 2013/0287* (2013.01)

(58) Field of Classification Search
CPC . B32B 27/365; B32B 37/15; B32B 2307/202; B32B 2307/412; B32B 2307/414; B32B 2451/00; B32B 2605/003
See application file for complete search history.

(56) References Cited

U.S. PATENT DOCUMENTS

2017/0291493 A1* 10/2017 Bostick ................. B60K 35/10
2019/0077311 A1   3/2019 Ali et al.
2019/0135199 A1   5/2019 Galán Garcia et al.

* cited by examiner

FUNCTIONAL INTERIOR FITTING PART FOR A MOTOR VEHICLE, AND METHOD FOR PRODUCING SUCH A FUNCTIONAL INTERIOR FITTING PART

CROSS REFERENCE TO RELATED APPLICATIONS

This application is a national phase application of international application PCT/EP2020/082526, filed Nov. 18, 2020, and further claims priority to German patent application DE 102019131783.5, filed 25 Nov. 2019, the content of both of which are herein incorporated by reference.

BACKGROUND OF THE INVENTION

Field of the Invention

The present invention relates to a functional interior equipment part for a vehicle, in particular for a motor vehicle. Furthermore, the invention relates to a method for manufacturing such a functional interior trim part.

Description of Related Art

In the state of the art, it is known to equip vehicle interior components with operating zones. This makes it possible to provide an operating option, for example the control option for operable systems such as head-up displays or screens. For this purpose, a hard operating surface is typically integrated into the interior trim part.

For example, EP 2 378 846 A1 describes a molded component comprising an electrical and/or electronic circuit with a conductor track structure and at least one electrical or electronic component. In particular, the surface of the molded component is designed functionally there, resulting in a three-dimensionally shaped operating element.

However, the known interior components have the disadvantage that the operating zones have to be hard to fulfill the operating function. Integration in soft comfort zones, for example in an armrest, is therefore difficult to implement. The operating and comfort zones are therefore clearly delineated and cannot be adapted to the user's anatomy, such as height; seat dwarf or seat giant and their sitting position or needs.

SUMMARY OF THE INVENTION

The invention is therefore based on the task of specifying a functional interior equipment part for a vehicle which eliminates the above-mentioned problems and disadvantages of the prior art. In particular, it is the task of the present invention to specify a functional interior equipment part which allows a spatial combination of operating and comfort zones and thus an improved integration of operating zones into comfort zones.

It is further the object of the invention to provide a method of manufacturing such a functional interior trim component.

The solution according to the invention consists in specifying a functional interior equipment part for a vehicle, which has a layered structure, the layered structure having at least a base support, a functional layer and a haptic layer, the functional interior equipment part having an electrical shielding layer, the electrical shielding layer leading to a selective sensor field expression in the direction of an operating half-space, and the electrical shielding layer being arranged on a side of the functional layer facing away from the haptic layer.

In principle, the layer structure is such that, viewed from the operating side or operating surface, the functional layer is arranged on or above the base substrate and the haptic layer is arranged on or above the functional layer. The fact that the electrical shielding layer is arranged on a side of the functional layer facing away from the haptic layer means that the electrical shielding layer can be arranged, for example, between the functional layer and the base substrate or on a side of the base substrate facing away from the functional layer.

More generally, the electrical shielding layer is located under the functional layer, i.e. away from the user or the operating side.

A functional interior equipment part is understood to be such an interior equipment part with which it is possible to control any function within the vehicle, preferably motor vehicle. For example, the menu control of head-up displays or screens in the vehicle is thus possible.

The functional layer is a layer that enables the execution of the respective function through detected changes in an electric field. This happens in particular because the positioning and movement of a finger changes the electric or electromagnetic field represented by means of electric field lines. In particular, the functional layer is designed as a capacitive functional layer in which the capacitance changes when a user's finger or another conductive object comes within functional range.

The base support can also be designed as a layer. Furthermore, the base support can form a three-dimensional contour of the interior trim part. For example, the base support may form the shape of a comfort element, such as an armrest or a center console. The base support can, for example, be formed from a thermoplastic or thermoset plastic or a fiber composite material.

The haptic layer is a layer that creates a soft feel of the functional interior design part. The haptic layer can, for example, be formed from a textile, in particular a nonwoven, woven or knitted fabric. Similarly, the haptic layer may be formed from a foamed plastic. "Soft" is understood to be the opposite of "hard" or "firm"; in particular, "soft" is understood to be a texture that yields slightly to pressure, so that it is possible to change the shape easily and with little force.

With the functional interior part according to the invention, the task is solved in a satisfactory manner. In particular, it is possible to spatially integrate operating and comfort zones. For example, it is specifically possible to provide an armrest with a large-area and soft operating zone (touch functionality). In addition, the flowing transition between the operating zone and the comfort zone significantly increases design freedom.

In order for the haptic layer to ensure a sufficiently soft texture of the interior trim part, it must have a certain layer thickness. On the other hand, this layer thickness ensures that the electric field required for operation (the electric field lines) is not strong enough to propagate through the "thick" haptic layer to an operating surface. Consequently, operation through the haptic layer is not possible without further ado or is severely disturbed.

The fact that the electrical shielding layer is arranged on a side of the functional layer facing away from the haptic layer results in selective sensor field expression in the direction of an operating half-space, which means that operation is possible from the operating surface. The operating surface is defined as the surface of the outermost layer (furthest away from the base substrate).

A possible interaction with the field lines of the sensor array therefore only occurs from the touch side, i.e. from the user interface and not from the B side of the array.

The increased spatial sensitivity also increases the signal-to-noise ratio, so that with a higher field excitation and a higher sensitivity is possible without false sensing. The electrical shielding layer has a shielding effect against electronic interference that can mask or distort signals, such as current routing for the illumination units.

As a result, the arrangement leads to improved recognition of the field lines modified by touch operation, because the interference signals are shielded from the side facing away from the haptic layer and thus have no influence on the field lines required for operation recognition.

The shielding layer can also be, for example, merely a coating arranged on the B side of the functional layer or the base substrate.

According to an advantageous further embodiment of the invention, the electrical shielding layer is a grounded or groundable grounding layer.

The grounding layer establishes a defined reference potential or potential equalization.

According to an advantageous further development of the invention, the electrical shielding layer is formed from a conductive material, at least in certain areas.

Preferably, the electrical shielding layer is formed entirely from the conductive material. The conductive material can be, for example, copper, ITO (indium tin oxide) or CNBs (Carbon NanoBuds).

According to an advantageous further embodiment of the invention, the electrical shielding layer has a coating of a conductive material.

This means that the electrical shielding layer does not have to be made entirely of the conductive material (e.g. grid structure, etc.). Rather, it is sufficient if it has a coating of a conductive material. The coating can be CNB or ITO in particular. Advantageously, the amount of expensive conductive material required can be reduced.

According to an advantageous further development of the invention, the functional layer has a plurality of conductive tracks.

The conductor tracks (made of silver, for example) are preferably arranged as a matrix structure or diamond structure or flower structure. The conductor tracks serve to give the functional layer its function as an interface between man and machine.

According to an advantageous further development of the invention, the haptic layer is formed from a soft material, at least in certain areas.

Preferably, the haptic layer is formed entirely from a soft material. The haptic layer is preferably formed from a textile, in particular a nonwoven, woven or knitted fabric. Alternatively, the haptic layer can be formed from a foamed plastic.

Preferably, the functional interior trim component may further comprise a decorative layer disposed on the haptic layer. The decorative layer serves in particular to leave a value-conveying visual impression on a user. For example, the decorative layer may be fabric or leather. A layer that imitates these materials is also conceivable.

Alternatively, the surface area of the haptic layer is already processed in such a way that it meets the requirements placed on a decorative layer.

According to an advantageous further development of the invention, the functional layer is functionally connected or connectable to a controller.

Preferably, the controller is a microcontroller. Through the functional connection, the input signal entered by fingers, for example, is passed on to the controller and can be processed there accordingly, so that a head-up display can be controlled, for example.

According to an advantageous further development of the invention, at least the base support, the shielding layer, the functional layer and the haptic layer are formed, at least in regions, from a transparent or translucent material in such a way that light can be transmitted from the base support to the haptic layer.

If the decorative layer is arranged, it can also be transparent or translucent.

The transparent or translucent layers make it possible to backlight the interior.

The functional interior equipment part can further comprise a light source and/or a light guide. The light from the light source can then be coupled into the interior equipment part (in particular into the base support) either directly or via the light guide.

The fact that the layers are made of transparent or translucent material, at least in some areas, means that the light is visible to a user at the operating surface, so that an operating display, for example as a menu control, is also conceivable with the light. In particular, it is possible to highlight control elements on the control surface or on the uppermost layer, i.e. on the haptic layer or possibly on the decorative layer.

Suitable materials include polycarbonate for the base substrate and ITO, copper (mesh) and silver (mesh) for the functional layer and CNBs. A translucent spacer fabric can be used as a haptic layer, for example. If a decorative layer is used, it can be perforated, for example. A translucent or transparent adhesive is particularly suitable as a bond between the layers.

The solution according to the invention further comprises providing a method for manufacturing one of the above functional interior parts for a vehicle, the method comprising the following steps: providing the base support; and providing the electrical shielding layer, which is either laminated together with the functional layer to form a composite and then subsequently bonded to the base support, or is bonded to the base support in advance.

According to an advantageous further development of the invention, the bonding of the composite of electrical shielding layer and functional layer to the base substrate is integrated by back-injection molding of the base substrate.

In particular, the process makes it easy to integrate the provision of the electrical shielding layer into the manufacturing process of the interior trim part. Back injection molding provides a particularly cost-efficient manufacturing process in which the electrical shielding layer and functional layer, which are laminated in advance to form a composite, can be inserted into the mold and then back injection molded with the base substrate.

The haptic layer is then bonded, preferably glued, to the functional layer. If a decorative layer is present, it can be laminated onto the haptic layer. In particular, wet, dry or thermal lamination is possible.

To produce translucency, it is possible to process the decorative layer using a laser process.

Further advantages of the invention are apparent from the description and drawings.

The invention is explained in more detail below by means of the description of examples of embodiments with reference to the accompanying drawings. In this connection, further advantageous embodiments and combinations of features of the invention result from the following description and the totality of the patent claims.

BRIEF DESCRIPTION OF THE SEVERAL VIEWS OF THE DRAWING

Further advantages, features, and details of the various embodiments of this disclosure will become apparent from the ensuing description of a preferred exemplary embodiment and with the aid of the drawings. The features and combinations of features recited below in the description, as well as the features and feature combination shown after that in the drawing description or in the drawings alone, may be used not only in the particular combination recited, but also in other combinations on their own, without departing from the scope of the disclosure.

An advantageous embodiment of the present invention is set out below with reference to the accompanying figures, wherein.

DETAILED DESCRIPTION OF THE INVENTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of "A, B, and C" should be understood as including only one of A, only one of B, only one of C, or any combination of A, B, and C.

In the figures, an "up" direction is understood to be such a direction that points toward a user, whereas a "down" direction is such a direction that points away from the user and, in particular, toward a vehicle structure.

Figure 1:
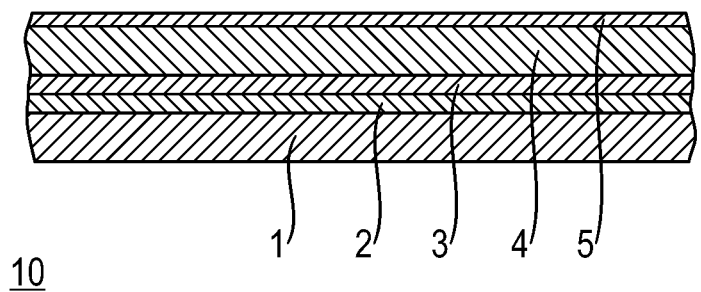
FIG. 1 depicts a schematic representation of the layered structure of the functional interior part according to the invention.

FIG. 1 depicts a schematic representation of the layer structure of a functional interior trim part 10. The interior trim part 10 shown in FIG. 1 has several layers arranged one above the other. The lowest layer is a base support 1 on which the other layers are arranged or supported by it. An electrical shielding layer 2 is arranged directly above the base substrate 1, on which in turn a functional layer 3 is arranged.

It is important here that the electrical shielding layer 2 is arranged below the functional layer 3. Here, the electrical shielding layer 2 is arranged between the functional layer 3 and the base substrate 1 as an example. Alternatively, it would be possible here, for example, to arrange the electrical shielding layer 2 under the base substrate 1.

A haptic layer 4 is arranged above the functional layer 3. The haptic layer 4 has a greater layer thickness than the electrical shielding layer 2 and the functional layer 3 and is made of a soft material which yields accordingly when touched and thus leaves a "soft" impression on the user.

A decorative layer 5 is arranged on the haptic layer 4. The decorative layer 5 is optional. Alternatively, the haptic layer 4 or, more precisely, the surface of the haptic layer 4 facing the user (operating surface) can be processed in such a way that it already meets the visual requirements for the interior trim part 10.

Figures 2A, 2B:
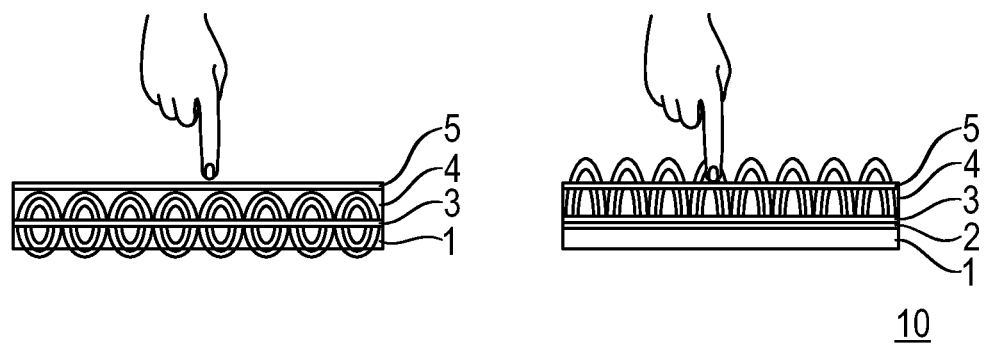
FIGS. 2a and 2b depict a schematic diagram explaining the operation of the electrical shielding layer in the functional interior part according to the invention.

FIGS. 2a and 2b depict more clearly how the electrical shielding layer 2 works. In particular, it is clear here what the shielding layer 2 is arranged for between the base substrate 1 and the functional layer 3.

FIG. 2a depicts a layered structure with the base substrate 1, the functional layer 3, the haptic layer 4 and the decorative layer 5. In particular, in the layered structure of FIG. 2a, the electrical shielding layer 2 is thus not arranged.

FIG. 2a also depicts the electric field lines of the functional layer 3, which emanate in a circle from the functional layer 3. The electric field lines are used here to represent the electric field as a space in which forces can be exerted on charges from the functional layer 3.

In particular, it can be seen that the electric field does not reach the operating surface that can be reached by the user's finger, in this case decorative layer 5. Consequently, interaction of the user with the functional layer 3 is not possible in the layer structure shown in FIG. 2a.

FIG. 2b depicts the layered structure of the functional interior trim part 10 according to the present invention, in which the electrical shielding layer 2 is arranged in addition to the base support 1, the functional layer 3, the haptic layer 4 and the decorative layer 5. Here, the electrical shielding layer 2 is arranged in such a way that it is sandwiched between the base support 1 and the functional layer 3.

The electrical shielding layer 2 is formed of a conductive material or has such a conductive material and is connected to ground. As a result, the electrical shielding layer 2 leads to a selective sensor field expression in the direction of the operating half-space.

A possible interaction with the field lines of the sensor array therefore only occurs from the touch side and not from the B side of the array.

With increased spatial sensitivity, the signal-to-noise ratio increases, so that with higher field excitation, higher sensitivity is possible without false sensing.

As a result, the arrangement leads to improved detection of the field lines altered by touch operation (either interference, attenuation or dissipation), because the interference signals are shielded from the side facing away from the haptic layer and thus have no influence on the field lines required for operation detection.

Thus, the electric field extends further from the functional layer 3 towards the user.

Consequently, a user can reach the electric field with his finger and thereby interact with the functional layer 3. If the user's finger is in the electric field, a small charge transport occurs. This can be detected or measured so that the contact position of the finger can be determined. The processing of this information takes place in a controller.

Thus, the electrical shielding layer 2 also enables capacitive operation through the relatively thick haptic layer 4. This makes it possible to integrate an operating zone "invisibly" in a comfort zone.

Since the devices and methods described in detail above are examples of embodiments, they can be modified to a wide extent by the skilled person in the usual manner without leaving the scope of the invention. In particular, the mechanical arrangements and the proportions of the individual elements with respect to each other are merely exemplary. Some preferred embodiments of apparatus according to the invention have been disclosed above. The invention is not limited to the solutions explained above, but the innovative solutions can be applied in different ways within the limits set by the claims.

The invention claimed is:

1. A functional interior trim component for a vehicle, comprising:
    a layered structure comprising at least a base support, a functional layer and a haptic layer;
    an electrical shielding layer comprising leads to a selective sensor-field expression arranged in a direction of an operating half-space, and
    wherein the electrical shielding layer is arranged on a side of the functional layer facing away from the haptic layer.

2. The functional interior trim component for a vehicle according to claim 1, wherein the electrical shielding layer is a grounded or groundable grounding layer.

3. The functional interior trim component for a vehicle according to claim 1, wherein the electrical shielding layer comprises a conductive material arranged at least in regions.

4. The functional interior trim component for a vehicle according to claim 1, wherein the electrical shielding layer comprises a coating of a conductive material.

5. The functional interior trim component for a vehicle according to claim 1, wherein the functional layer comprises a plurality of conductive tracks.

6. The functional interior trim component for a vehicle according to claim 1, wherein the haptic layer comprises a soft material arranged at least in regions.

7. The functional interior trim component for a vehicle according to claim 1, wherein the functional layer is arranged functionally connected or connectable to a controller.

8. The functional interior trim component for a vehicle according to claim 1, wherein at least the base support, the electrical insulation layer, the functional layer and the haptic layer are formed at least in regions from a transparent or translucent material such that light can be transmitted from the base support to the haptic layer.

9. A method of manufacturing a functional interior trim component for a vehicle, the method comprising the steps of:
    providing a base support;
    providing a functional layer and a haptic layer;
    providing an electrical shielding layer on the base support, the electrical shielding layer comprising leads to a selective sensor-field expression in a direction of an operating half-space, and
    laminating the electrical shielding layer together with the functional layer to form a composite and then subsequently bonding the composite to the base support or to the base support in advance.

10. The method according to claim 9, wherein the bonding of the composite of electrical shielding layer and functional layer to the base support is integrated by back-injection molding of the base support.

* * * * *